July 24, 1962  F. E. COCHRAN  3,045,984
FLUID BLENDER
Filed June 8, 1959  2 Sheets-Sheet 1
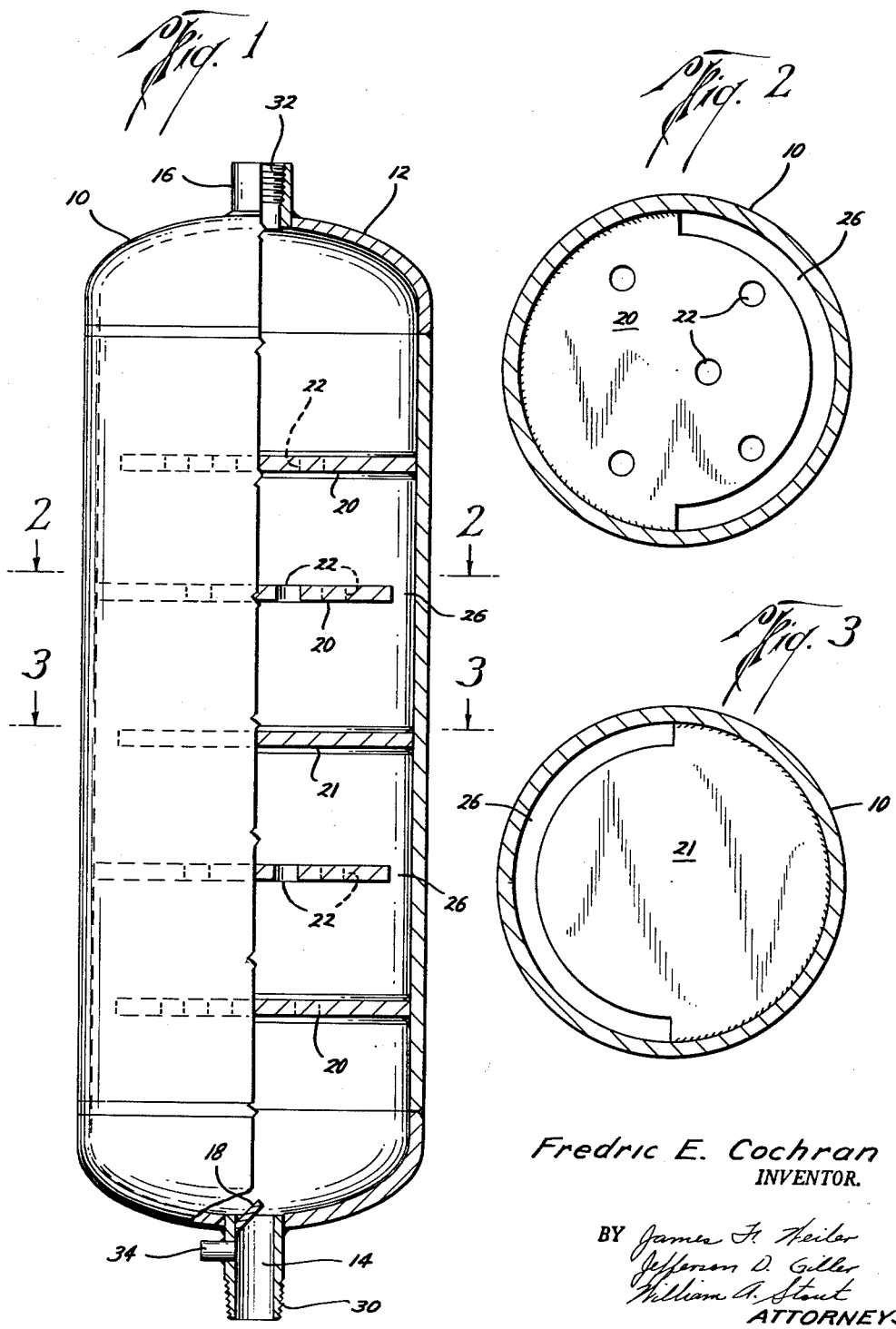
Fredric E. Cochran
INVENTOR.
BY James F. Weiler
Jefferson D. Giller
William A. Stout
ATTORNEYS

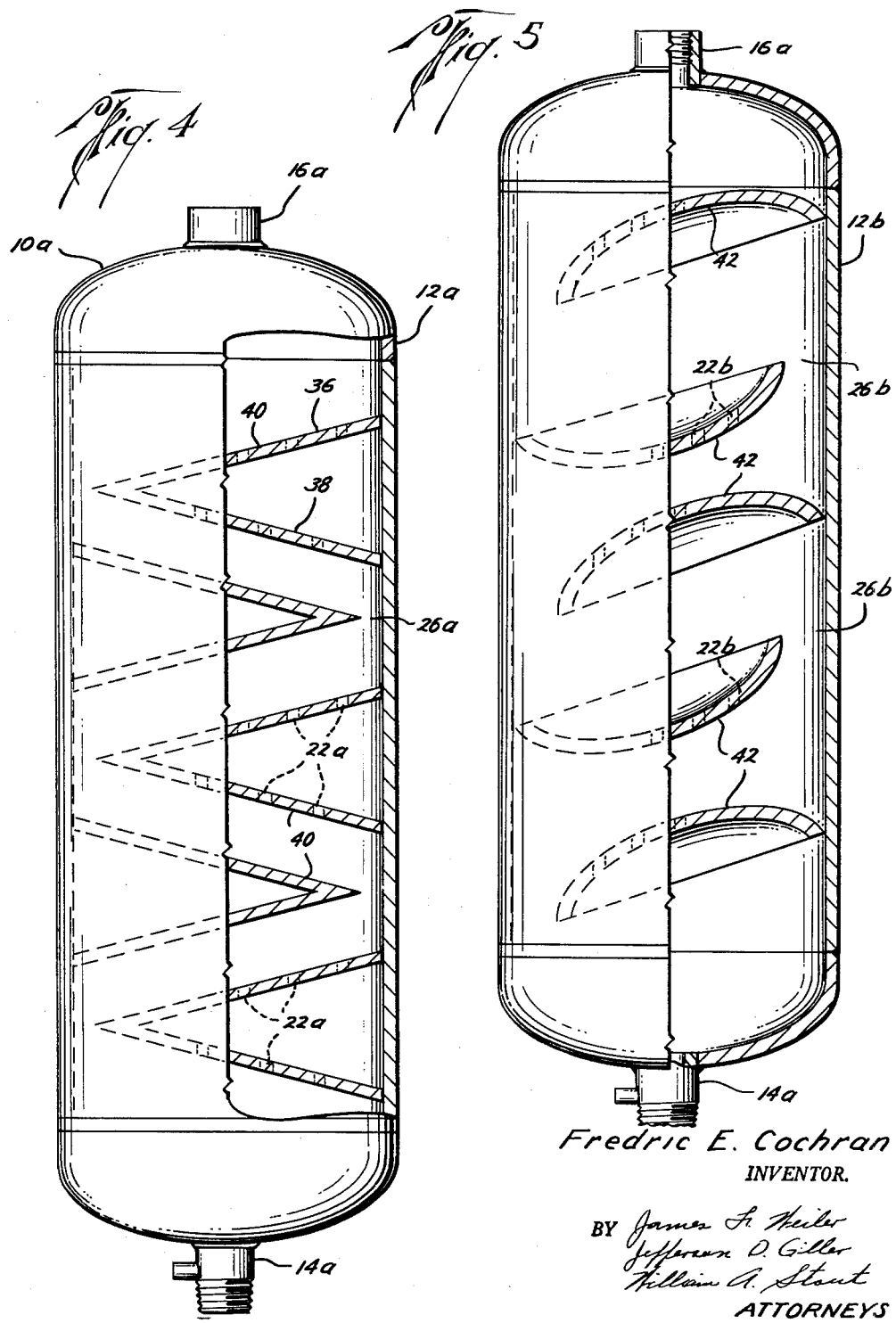

United States Patent Office 3,045,984
Patented July 24, 1962

3,045,984
FLUID BLENDER
Fredric E. Cochran, 7222 Prestwick, Houston 25, Tex.
Filed June 8, 1959, Ser. No. 818,661
4 Claims. (Cl. 259—4)

The present invention relates to a fluid blender, and more particularly relates to a fluid blender which thoroughly mixes and disperses a fluid mixture.

In the oil industry it has been common practice to inject chemicals into the oil well fluid to break the crude oil-water emulsion. However, it has been estimated that the full efficiency of the chemicals has not been obtained because (1) the chemical is usually injected in the oil well fluid flow line one droplet at a time thus causing a stratification condition in the well fluid of the chemicals thus preventing full dispersion of the chemicals, (2) the gravity of the oil well fluid varies which means that in the more viscous fluids it is more difficult to distribute the chemical in the fluid, (3) and the temperature at which the oil fluid is treated affects the viscosity so that at low temperatures the chemical efficiency becomes very low.

It is an object of this invention to provide an improved fluid blender which will more thoroughly mix and disperse a fluid mixture as it passes through the apparatus.

A further object of the present invention is the provision of an improved fluid blender which will more thoroughly disperse chemical injections so as to obtain the maximum efficiency from the chemicals.

Yet a still further object of the present invention is the provision of a fluid blender in which a fluid mixture may be mixed and blended to obtain a thorough mixture of the elements of the mixture as they pass through the apparatus.

Yet a further object of the present invention is the provision of an improved fluid blender which thoroughly disperses and mixes a fluid by restricting and controlling the direction and rate of flow.

Yet a further object of this invention is the provision of a fluid mixing apparatus which thoroughly mixes the fluid as it passes through but yet provides a through passage which will not be blocked or stopped up by debris in the fluids.

A still further object of this invention is the provision of a fluid blender which may be inserted in a continuous flow line and thoroughly mixes the fluid as it passes therethrough but yet provides a passageway which is not subject to being stopped up and thereby creating dangerous pressures.

A still further object of this invention is the provision of a fluid blender containing directional baffles which direct the flow of fluid through the blender so as to give the fluid a turbulent mixing action and disperse the fluid mixture.

Other and further objects, features and advantages will be apparent from the following description of presently preferred embodiments of the invention, given for the purpose of disclosure, and taken in conjunction with the accompanying drawings, where like character references designate like parts throughout the several views and where, FIGURE 1 is an elevational view, partly in section, illustrating an apparatus according to the invention, FIGURE 2 is a cross-sectional view taken along the line 2—2 of FIGURE 1, FIGURE 3 is a cross-sectional view taken along the line 3—3 of FIGURE 1, FIGURE 4 is an elevational view, partly in section, illustrating a modification of the apparatus according to the present invention wherein the baffles are substantially V-shaped forming mixing chambers, and FIGURE 5 is an elevational view, partly in section, illustrating a further modification of the present invention wherein the baffles are curved to increase the turbulence of the fluid as it passes through the blender.

Referring now to the drawings, and particularly to FIGURES 1, 2 and 3, the reference numeral 10 generally designates the fluid blender and includes an elongated cylindrical housing 12 which has a fluid inlet 14 and a fluid outlet 16. A series of spaced baffle plates 20 are provided in the interior of the housing 12 to deflect and mix the fluid as it passes through the fluid blender 10. The baffle plates 20 are alternately secured to opposite sides of the housing interior 12, preferably by welding, and extend transversely but not completely across the interior of the housing. Thus an opening 26 is provided between each of the baffles 20 and the housing 12 on alternate sides of the housing on adjacent baffles. The openings 26 provide a passageway through the blender 10 which is not likely to be stopped up by paraffin deposits or sand when blending a mixture of oil well fluids and the emulsion breaking chemicals. Also the passageway formed by the openings 26 is sufficiently restricted and staggered to insure that the fluid as it passes through the blender 10 will be thoroughly agitated and mixed. Additionally, perforations or holes 22 may be provided in the baffle plates to provide additional mixing and blending of the fluid at it passes the housing 12. Preferably, the perforations are located slightly nearer the opening 26 than the side wall connection to the baffles 20 so as to force more of the fluid to continually reverse its direction of flow to provide a thorough agitating motion.

If desired, one or more of the baffle plates, such as baffle 21 shown in FIGURES 1 and 3, may omit the perforations or holes in the baffles so as to insure full lateral movement of all of the fluid.

A deflecting plate 18 may be provided in the inlet 14 which serves to restrict and deflect the incoming fluid into a jet into the interior of the housing 12 to increase the turbulence and mixing action as the fluid enters the housing 12. Since the incoming fluid is usually passed through the blender 10 under pressure the deflector blade 18 acts to jet the incoming fluid into the mixture already in the lower part of the housing and increase the dispersion of the mixture.

As the fluid blender 10 is usually connected into conventional pipe lines, threaded connections 30 and 32 are provided at the inlet and outlet respectively, so that the blender may be used to continuously blend a fluid mixture in a continuously flowing process.

An opening 34 may be provided at the inlet 14 for the insertion of chemicals or for the placement of a pressure gauge.

Of course, various modifications of the baffles may be provided to more thoroughly mix the fluid as it passes through the blender but yet maintain a passageway throughout which will not be subject to clogging up. FIGURES 4 and 5 illustrate modifications of the baffle according to the invention, the letters "a," "b," being applied to parts corresponding to those in FIGURES 1–3, inclusive, for convenience of records.

Referring now to FIGURE 4, the baffles 40 include a structure being substantially V-shaped in cross-section thereby forming a mixing chamber inside the sides 36 and 38 which further serves to thoroughly mix the fluid as it passes through the blender 10a. The baffles 40 are alternately secured to opposite sides of the housing 12a similarly to the baffles 22 of FIGURE 1, thus maintaining a passageway through the blender 10a through the openings 26a.

Referring now to FIGURE 5, the baffles 42 are similarly mounted and positioned to the baffles 22 in FIG- URE 1 with the exception that the baffles are curved and alternate baffles are curved in opposite directions. Baffles 42 therefore tend to provide a swirling motion between the adjacent concave faces and thus more thoroughly disperse and mix the fluids. As in the other modifications of this invention openings 26b still provide a relatively unrestricted passage throughout the blender 10b.

In use, the blender 10 is inserted in a fluid line by means of the conventionally threaded connections 30 and 32 to mix and blend a continuously flowing fluid mixture. For example, as previously mentioned, it is desirable to treat the crude oil flowing from oil wells by various chemical agents and in order to obtain the maximum efficiency from the chemical agents they must be thoroughly mixed and blended with the oil well fluids. Preferably, the fluid blender 10 is installed in the vertical position as shown in the drawings with the inlet at the bottom although it may be used and will operate satisfactorily in other positions. Usually the chemical agent is added to the oil well fluid prior to the entrance of the mixture of fluid and chemicals to the blender 10. However, the opening 34 can be utilized to insert the chemicals into the fluid at this point prior to entrance to the blender 10. Otherwise, the opening 34 may be used to place a pressure gauge for measuring the pressure of the fluid entering the blender. As the fluid enters the blender through the inlet 14 it strikes the deflector plate 18, which restricts the inlet opening 14, and thus directs and jets the incoming fluid into the lower end of the housing 12. As the fluid is forced through the blender under pressure it is forced around and deflected by the baffles 20 and is directed through the openings 26 and the holes or perforations 22 where the fluid is thoroughly agitated, mixed and the chemicals are blended more thoroughly into the mixture to secure their maximum efficiency. The blended mixture of fluids is then ejected through the outlet 16.

The fluid blender 10a of FIGURE 4 operates similarly to that of FIGURE 1 with the exception that the baffles 40 increase the mixing action as the mixing chambers enclosed by the sides 36 and 38 provide additional blending of the fluids as the mixtures enter and leave the mixing chambers. In FIGURE 5 the baffles 42 also increase the mixing action by the rotary action given to the fluids by the concave faces of adjoining baffles 42.

It is noted that oil well fluids contain paraffin, sand and other impurities which have a tendency to collect and possibly block and stop up restricted fluid openings. However, the passageway through the blenders of the present invention is sufficiently large to prevent such a stoppage and therefore prevent the build up of any dangerous pressures in the fluid blender or fluid lines.

It is apparent that the invention is capable of use with a wide variety of different fluids. However for purposes of illustration and for example only the invention is shown in its application to mixing chemicals with an oil well fluid to increase the efficiency of the chemicals by more thoroughly dispersing them in the oil well fluid.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement of parts and numerous uses of the blenders may be made which will readily suggest themselves to those skilled in the art which are encompassed within the spirit of the invention and the scope of the appended claims.

What is claimed is:

1. A fluid blender comprising, a housing having an inlet and outlet, a deflector plate in and partially restricting the inlet jetting the flow of fluid through the inlet into the housing interior, a plurality of spaced baffles alternately secured to opposite sides of the housing interior and extending transversely but not entirely across the housing interior, said baffles being arcuate in cross section, alternate baffles being curved in opposite directions with adjacent concave faces in alignment facing each other thereby providing a rotary mixing action to the fluid as it passes between the concave faces of adjacent baffles.

2. The invention of claim 1 wherein the baffles are perforated, said perforations being near the free end of said baffles.

3. A fluid blender comprising, a housing having an inlet and an outlet, a plurality of spaced baffles alternately secured to opposite sides of the housing interior and extending transversely but not entirely across the housing interior, said baffles being arcuate in cross section, alternate baffles being curved in opposite directions with adjacent concave faces being directed at each other thereby providing a rotary mixing action to the fluid as it passes between the concave faces of adjacent baffles and providing alternate restrictions and enlarged areas in the undulating path of the fluid flow.

4. A fluid blender comprising, a housing having an inlet and an outlet, a plurality of spaced baffles alternately secured to opposite sides of the housing interior and extending transversely but not entirely across the housing interior, said baffles being secured to the interior of the housing at an angle, said baffles being arcuate in cross section, alternate baffles being curved in opposite directions with adjacent concave faces being directed at each other thereby providing a rotary mixing action to the fluid as it passes between the concave faces of adjacent baffles and providing alternate restrictions and enlarged areas in the undulating path of the fluid flow.

References Cited in the file of this patent

UNITED STATES PATENTS

| | | |
|---|---|---|
| 2,125,245 | McCray | July 26, 1938 |
| 2,138,469 | Barclay et al. | Nov. 29, 1938 |
| 2,194,946 | Kunstorff | Mar. 26, 1940 |
| 2,488,884 | Van Dijck | Nov. 22, 1949 |
| 2,567,998 | Griffith | Sept. 18, 1951 |
| 2,704,206 | Crook | Mar. 15, 1955 |